United States Patent
Lorenc et al.

(10) Patent No.: US 8,533,714 B2
(45) Date of Patent: Sep. 10, 2013

(54) DYNAMIC VIRTUAL MACHINE DOMAIN CONFIGURATION AND VIRTUAL MACHINE RELOCATION MANAGEMENT

(75) Inventors: Mark J. Lorenc, Endwell, NY (US);
Richard J. Moore, Hampshire (GB);
Damian L. Osisek, Vestal, NY (US)

(73) Assignee: International Business Machines Corporation, Armonk, NY (US)

( * ) Notice: Subject to any disclaimer, the term of this patent is extended or adjusted under 35 U.S.C. 154(b) by 192 days.

(21) Appl. No.: 13/100,078

(22) Filed: May 3, 2011

(65) Prior Publication Data

US 2012/0284709 A1    Nov. 8, 2012

(51) Int. Cl.
G06F 9/455 (2006.01)
G06F 9/46 (2006.01)
G06F 15/173 (2006.01)

(52) U.S. Cl.
USPC ............... 718/1; 718/100; 718/102; 718/104; 709/223; 709/224; 709/226

(58) Field of Classification Search
None
See application file for complete search history.

(56) References Cited

U.S. PATENT DOCUMENTS

| | | | |
|---|---|---|---|
| 5,551,013 A | 8/1996 | Beausoleil et al. | |
| 5,574,873 A | 11/1996 | Davidian | |
| 5,790,825 A | 8/1998 | Traut | |
| 6,009,261 A | 12/1999 | Scalzi et al. | |
| 6,308,255 B1 | 10/2001 | Gorishek et al. | |
| 6,463,582 B1 | 10/2002 | Lethin et al. | |
| 7,814,495 B1* | 10/2010 | Lim et al. | 718/104 |
| 2009/0007106 A1* | 1/2009 | Araujo et al. | 718/1 |
| 2009/0070760 A1 | 3/2009 | Khatri et al. | |
| 2009/0119664 A1* | 5/2009 | Pike et al. | 718/1 |
| 2010/0115095 A1* | 5/2010 | Zhu et al. | 709/226 |
| 2010/0138828 A1 | 6/2010 | Hanquez et al. | |
| 2010/0180274 A1* | 7/2010 | Cherian et al. | 718/1 |
| 2011/0004878 A1* | 1/2011 | Divoux | 718/1 |
| 2011/0099318 A1* | 4/2011 | Hudzia et al. | 711/6 |
| 2011/0119427 A1* | 5/2011 | Dow et al. | 711/6 |
| 2011/0320556 A1* | 12/2011 | Reuther | 709/213 |

OTHER PUBLICATIONS z/Architecture: "Principles of Operation"; Publication SA22-7832-07, Eighth Edition; p. 1-1344, Feb. 2009.
U.S. Appl. No. 12/822,368, filed Jun. 24, 2010.
U.S. Appl. No. 12/822,358, filed Jun. 24, 2010.

* cited by examiner

Primary Examiner — Emerson Puente
Assistant Examiner — Charles Swift
(74) Attorney, Agent, or Firm — Cantor Colburn LLP; Dennis Jung

(57) ABSTRACT

Dynamic relocation of virtual machines among hypervisors in a domain is provided. A domain management module is executed on a computer processor and is configured to receive a request to add a new hypervisor to a domain. Each hypervisor and each domain comprises an architecture description (ARD). A new canonical ARD is generated for all hypervisors in the domain. A virtual machine executing on a first system is relocated to any other hypervisor in the domain. Virtual machines may also be moved to out-of-domain hypervisors through the use of override masks. In addition, under certain conditions, new hypervisors additions, as well as hypervisor and system updates may be performed without disrupting the virtual machines that are controlled by the hypervisors.

5 Claims, 8 Drawing Sheets

DYNAMIC VIRTUAL MACHINE DOMAIN CONFIGURATION AND VIRTUAL MACHINE RELOCATION MANAGEMENT

BACKGROUND

The present invention relates generally to dynamic virtual machine domain configuration and specifically to virtual machine relocation, and the management thereof.

Live virtual machine relocation is the ability to dynamically move a guest executing on one virtual machine (VM) from one hypervisor to another without needing to shut down the guest or the guest's applications. When virtual machines are executing on hardware with different architectural capabilities, or on hypervisors with differing levels of functionality, it can be problematic for a virtual machine to move from one system to another. Instructions are provided to virtual machines that enable the virtual machine to determine which facilities are available on the system on which they are executing. This is usually done when the operating system or application is started, but may also be done at any time. If the virtual machine is first started on a system with more capabilities than another system to which it could be relocated, the virtual machine could lose access to facilities it has been using when it is relocated. Problems arise when a virtual machine is allowed to relocate dynamically back and forth between systems of unlike architectural facilities.

One option to handle this issue is for the administrator to specify an explicit feature set or machine model for each virtual machine. The software would then virtualize the virtual machine's environment to work at that level. This virtualization requires customer knowledge of the facilities available on each of the systems to which the virtual machine and its applications may be relocated. This could be problematic, especially if there are facilities that are optional. When that is the case, newer models are not necessarily supersets of the older models and it could be very difficult for the administrator to understand what is available from one machine to the next. Therefore, it would be difficult for the administrator to specify a model that allows the virtual machine to move between several machines that are different models.

In addition, computer systems that support hardware and firmware updates while allowing continuity of operation may result in a change to the system's architecture, which would create additional complications in managing the available feature set. One approach to handling updates would be to require that configuration or architecture changes be accompanied with a system reset and restart. This would allow the administrator to update the feature set, and distribute that information as appropriate.

SUMMARY

An embodiment includes a system for dynamic relocation of virtual machines in a domain. The system includes a domain management module that is configured to execute on a computer processor. The system is configured for receiving a request to add a new hypervisor to a domain, the new hypervisor comprising an architecture description (ARD). The system additionally includes generating a new canonical ARD for the domain, the new canonical ARD comprising an indicator of resources available to one or more virtual machine instances assigned to the domain. The system further includes moving a virtual machine executing on any hypervisor in the domain to any other hypervisor in the domain without losing resources.

BRIEF DESCRIPTION OF THE SEVERAL VIEWS OF THE DRAWINGS

The subject matter that is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
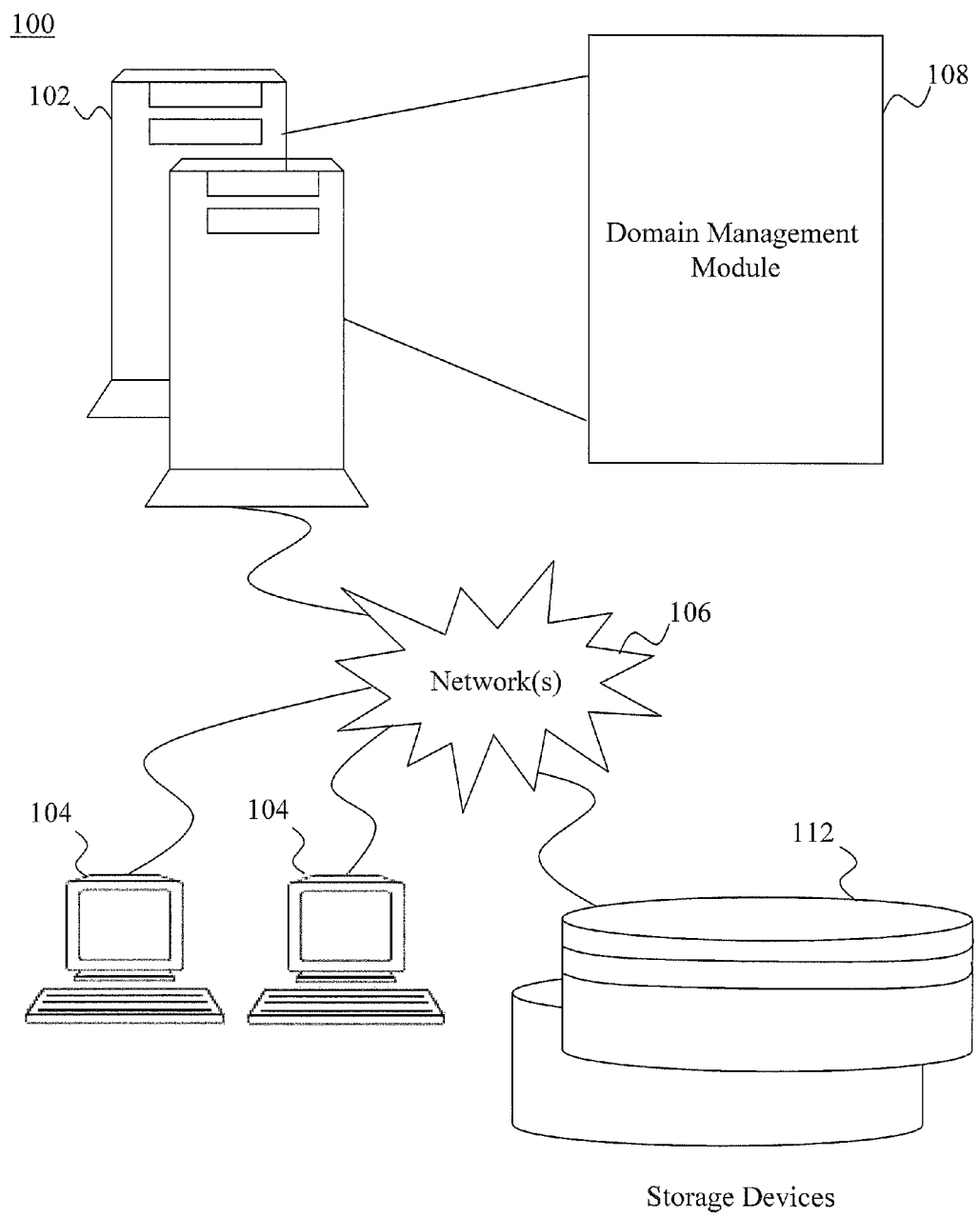
FIG. 1 illustrates a schematic diagram of a system for implementing dynamic virtual machine domain configuration and virtual machine relocation management.

In an embodiment, a cluster of hypervisors is established to provide virtual machine capabilities to one or more virtual machines. The cluster is divided into domains, with each domain including one or more hypervisors from the cluster. In an embodiment, the domain includes hypervisors for a plurality of clusters. In an embodiment, a single hypervisor belongs to one or more domains. Each of the hypervisors executes on a computer, and has available to it all of the functions and facilities (also referred to herein collectively as "resources") available from the computer on which it is executing. The resources include software instructions, machine code instructions, microcode instructions, and/or physical hardware capabilities. The domains provide a common set of the resources that the domain hypervisors expose to virtual machines, and provide a mechanism for ensuring that any virtual machine relocation occurs in a controlled and predictable manner.

An embodiment includes a data structure called an architecture description (ARD) that represents the architecture available to a machine. The ARD includes everything necessary to respond to a virtual machine's request for information about which resources are available to it. When each hypervisor is initialized, it builds an ARD that describes the capabilities of the machine on which it is running and which can be presented as available to its virtual machines. In an embodiment, this ARD is written to a common disk area that is available to all hypervisors in the cluster. As each hypervisor joins the cluster, it writes its own ARD to this common area and reads the ARDs of all the other hypervisors. A "singleton" relocation domain that points to the ARD for that hypervisor is created for each individual member of the cluster so that every hypervisor knows the capabilities of all the other hypervisors.

In an embodiment, the ARD also encodes information relating to functional capabilities of a hypervisor by including an ARD version number and self-defining sub-structures. Hypervisors not operating at the same functional level as the one that creates the singleton ARD may either deduce that they are incompatible with the hypervisors already established as members of the cluster; or may calculate common characteristics from the self-defining substructures. This allows the cluster to comprise a heterogeneous collection of hypervisors able to support live guest relocation.

Administrator-defined relocation domains can then be created. A relocation domain is some subset of the members of a cluster of hypervisors. Each relocation domain has an ARD associated with it that represents that domain's architecture. This is the domain's canonical ARD. When a virtual machine is assigned to a relocation domain, the canonical ARD of that domain becomes the representation of the virtual machine's virtual architecture. Thus, the singleton domain's canonical ARD represents the architecture of that single member of a cluster of systems. The canonical ARD of each domain represents the domain's virtual architecture. In an embodiment, virtual machines may be assigned to one of the domains and connected to the domain's ARD, which then represents that virtual machine's virtual architecture. In an embodiment, that ARD is used to simulate the instructions, which report what resources are available to that virtual machine.

In an embodiment, once the singleton ARDs are read and saved, the virtual architecture of all administrator-defined relocation domains is generated. In an embodiment, the ARD for a relocation domain, which contains more than one cluster member, is calculated by intersecting the ARDs of all members of the domain. This intersection represents the "maximal common subset" of facilities that are available to a virtual machine assigned to that domain. That is, all facilities available on all members are included as available to virtual machines in the domain; and any facility that is not available on all members, is not included. In an embodiment, this calculated ARD then becomes the architecture description used to present available architecture to any virtual machines assigned to that domain.

In an embodiment, there may be situations, for example in an emergency, when a virtual machine must be relocated out of its assigned relocation domain. Doing this may cause the virtual machine to move to a hypervisor that has different architectural capabilities than that of its assigned domain. In an embodiment, when this is attempted, the ARD currently in use by the virtual machine (the domain's canonical ARD) is compared to the singleton ARD of the target destination hypervisor to determine compatibility. If the target's ARD is equal to or a superset of the virtual machine's current ARD, then the relocation is allowed. In an embodiment, relocation to a hypervisor with a subset of the virtual machine's current ARD is allowed if an explicit force option is specified. It is then up to the administrator to ensure that the software in the virtual machine is not relying on the unavailable features or to accept the consequences (e.g., failure of one or more applications within the virtual machine, or reversion from a hardware-exploitive to a software algorithm).

In an embodiment, when a virtual machine is moved out of domain, a new ARD is created to represent the virtual machine's architecture. This ARD consists of the intersection of the virtual machine's previous ARD and the canonical ARD of the singleton domain of the out-of-domain member to which the virtual machine is moving. The new ARD is called a variant ARD of the domain. The variant ARD is associated with the domain until the virtual machine is relocated to another member at which time the virtual machine will be connected either to a new variant ARD or to its domain's canonical ARD as appropriate.

In an embodiment, a change to a relocation domain that adds member hypervisors, removes member hypervisors, and/or changes the architecture of a member hypervisor by adding and removing features may cause the canonical ARD to be altered. In an embodiment, new features are presented dynamically to a virtual machine, however, it is not acceptable to remove features without first ensuring that such features are not in use. In an additional embodiment, new features are not presented to a virtual machine, and any new features are processed in the same way as a removal of a feature is processed. In an embodiment, feature compatibility is maintained by assigning to the relocation domain a membership list. In an embodiment, the membership list is a binary string where a 0 indicates a hypervisor within the cluster of systems is not a member of this domain and a 1 indicates the converse. In additional embodiments, any other method of indicating membership in the domain, such as a list, XML file, or other methods known in the art may be used. In addition, the canonical ARD, and zero or more variant ARDs, are assigned to each relocation domain. In an embodiment, a variant domain represents deviations from the architecture defined by the canonical ARD. In an embodiment, a membership override mask is assigned to each ARD. In an embodiment, the membership override mask is a binary string where a 0 indicates that the corresponding value in the domain membership mask is unaffected by the override mask, and a 1 indicates that the corresponding domain membership mask bit is reversed in meaning. In additional embodiments, any other method of indicating an override to the membership in the domain, such as a list, XML file, or other methods known in the art may be used. The use of the two masks in combination allows for a variant ARD to be associated with a modified membership list.

In an embodiment, virtual machines being instantiated in a relocation domain will be connected to the domain's canonical ARD. When a subsequent domain reconfiguration occurs the canonical ARD is recalculated based on current membership list and architectures of the constituent members. If it is discovered that resources would be lost in comparison with the old canonical ARD, then, in an embodiment, where this is due to a domain membership change then a virtual machine retains its old ARD with an updated override mask to suppress newly added members that do not support the entire previous feature set. In an embodiment, where the loss of resources is due to an architecture update being applied to a constituent member and the domain loses features as a result of this update, then any virtual machine not executing on the updated member has its currently connected ARD 'demoted' to being a variant ARD, if not already the case, and the override mask for that member is recalculated to exclude the member that caused the loss of features. In an embodiment, variant ARDs for variant domains are retained for as long as there are virtual machines using them.

Turning now to FIG. 1, a system 100 for implementing dynamic virtual machine domain configuration and virtual machine relocation management will now be described. In an exemplary embodiment, the system 100 includes a host system computer 102 executing computer instructions for dynamic virtual machine domain configuration and virtual machine relocation management. Host system computer 102 may operate in any type of environment that is capable of executing a software application. Host system computer 102 may comprise a high-speed computer processing device, such as a mainframe computer, to manage the volume of operations governed by an entity for which the dynamic virtual machine domain configuration and virtual machine relocation management is executing. In an exemplary embodiment, the host system computer 102 is part of an enterprise (e.g., a commercial business) that implements the dynamic virtual machine domain configuration and virtual machine relocation management.

In an exemplary embodiment, the system 100 depicted in FIG. 1 includes one or more client systems 104 through which users at one or more geographic locations may contact the host system computer 102. The client systems 104 are coupled to the host system computer 102 via one or more networks 106. Each client system 104 may be implemented using a general-purpose computer executing a computer program for carrying out the processes described herein. The client systems 104 may be personal computers (e.g., a lap top, a personal digital assistant, a mobile device) or host attached terminals. If the client systems 104 are personal computers, the processing described herein may be shared by a client system 104 and the host system computer 102 (e.g., by providing an applet to the client system 104). Client systems 104 may be operated by authorized users (e.g., programmers) of the dynamic virtual machine domain configuration and virtual machine relocation management described herein.

The networks 106 may be any type of known network including, but not limited to, a wide area network (WAN), a local area network (LAN), a global network (e.g., Internet), a virtual private network (VPN), and an intranet. The networks 106 may be implemented using a wireless network or any kind of physical network implementation known in the art. A client system 104 may be coupled to the host system computer 102 through multiple networks (e.g., intranet and Internet) so that not all client systems 104 are coupled to the host system computer 102 through the same network. One or more of the client systems 104 and the host system computer 102 may be connected to the networks 106 in a wireless fashion. In one exemplary embodiment, the networks 106 include an intranet and one or more client systems 104 execute a user interface application (e.g., a web browser) to contact the host system computer 102 through the networks 106. In another exemplary embodiment, the client system 104 is connected directly (i.e., not through the networks 106) to the host system computer 102 and the host system computer 102 contains memory for storing data in support of dynamic virtual machine domain configuration and virtual machine relocation management. Alternatively, a separate storage device (e.g., storage device 112) may be implemented for this purpose.

In an exemplary embodiment, the storage device 112 includes a data repository with data relating to dynamic virtual machine domain configuration and virtual machine relocation management by the system 100, as well as other data/ information desired by the entity representing the host system computer 102 of FIG. 1. The storage device 112 is logically addressable as a consolidated data source across a distributed environment that includes networks 106. Information stored in the storage device 112 may be retrieved and manipulated via the host system computer 102 and/or the client systems 104. In an exemplary embodiment, the storage device 112 includes one or more databases containing, e.g., dynamic virtual machine domain configuration and virtual machine relocation management data and corresponding configuration parameters, values, methods, and properties, as well as other related information as will be discussed more fully below. In an embodiment, the storage device 112 is centrally located and provides a central repository for system ARD's including canonical ARD's and other such files and configuration data. It will be understood by those of ordinary skill in the art that the storage device 112 may also comprise other structures, such as an XML file on the file system or distributed over a network (e.g., one of networks 106), or from a data stream from another server located on a network 106. In an additional embodiment, all or a portion of the storage device 112 may alternatively be located on a client system 104.

The host system computer 102 depicted in the system of FIG. 1 may be implemented using one or more servers operating in response to a computer program stored in a storage medium accessible by the server. The host system computer 102 may operate as a network server (e.g., a web server) to communicate with the client systems 104. The host system computer 102 handles sending and receiving information to and from the client systems 104 and can perform associated tasks. The host system computer 102 may also include a firewall to prevent unauthorized access to the host system computer 102 and enforce any limitations on authorized access. For instance, an administrator may have access to the entire system and have authority to modify portions of the system. A firewall may be implemented using conventional hardware and/or software as is known in the art.

The host system computer 102 may also operate as an application server. The host system computer 102 executes one or more computer programs to provide dynamic virtual machine domain configuration and virtual machine relocation management. The host system computer 102 includes a domain management module 108 for managing domains and ARD's in an embodiment. As indicated above, processing may be shared by the client systems 104 and the host system computer 102 by providing an application (e.g., java applet) to the client systems 104. Alternatively, the client system 104 can include a stand-alone software application for performing a portion or all of the processing described herein. As previously described, it is understood that separate servers may be utilized to implement the network server functions and the application server functions. Alternatively, the network server, the firewall, and the application server may be implemented by a single server executing computer programs to perform the requisite functions.

It will be understood that the dynamic virtual machine domain configuration and virtual machine relocation management described in FIG. 1 may be implemented in hardware, software, or a combination thereof.

Figure 2:
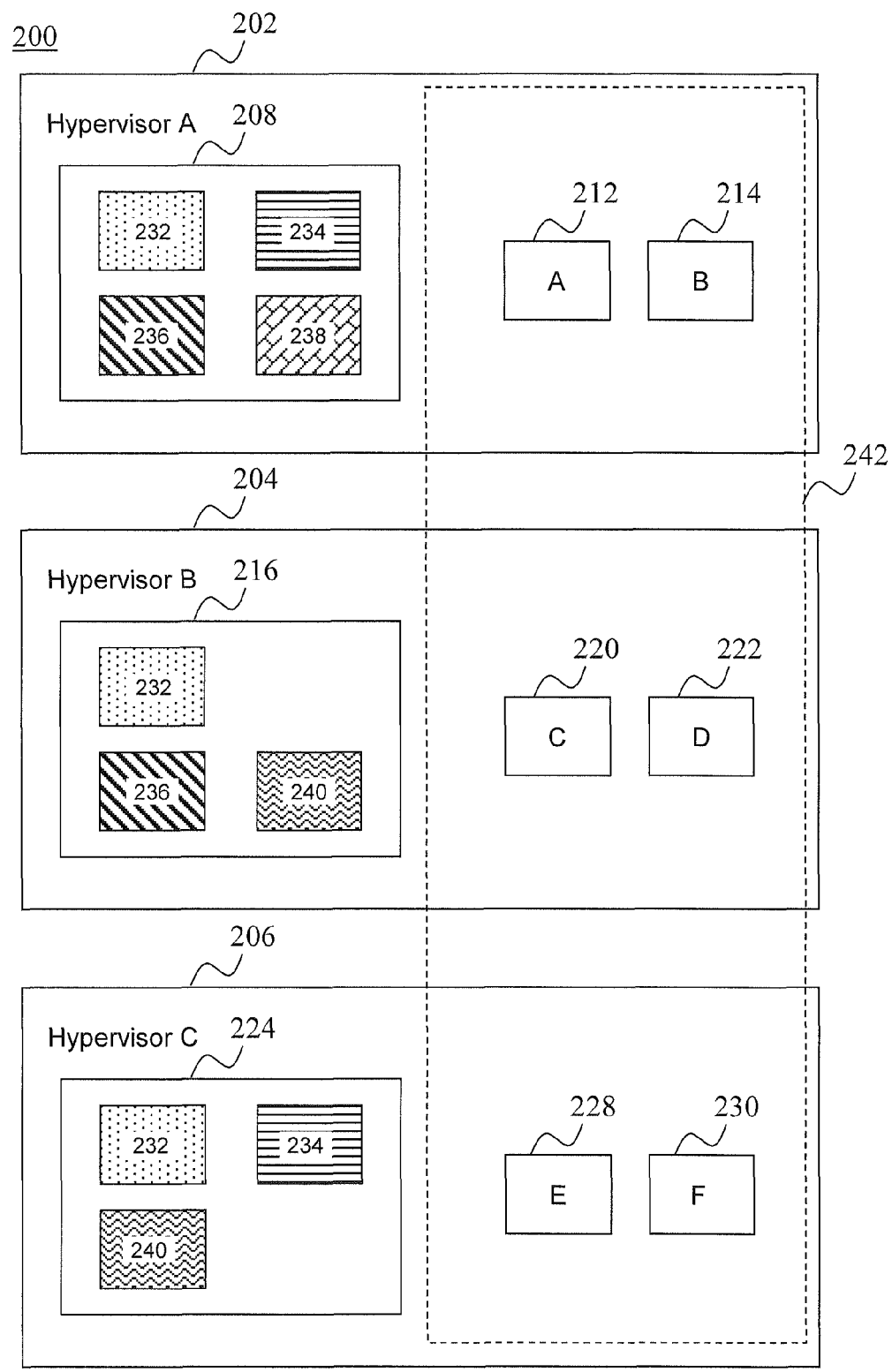
FIG. 2 illustrates a schematic diagram of the various components in a system for dynamic virtual machine domain configuration and virtual machine relocation management in accordance with an embodiment.

FIG. 2 illustrates a schematic diagram of the various components in a system for dynamic virtual machine domain configuration and virtual machine relocation management in accordance with an embodiment. A dynamic virtual machine domain configuration and virtual machine relocation management system 200 includes a plurality of systems. In an embodiment, the dynamic virtual machine domain configuration and virtual machine relocation management system 200 includes a hypervisor A 202, a hypervisor B 204, and a hypervisor C 206. In alternate embodiments the dynamic virtual machine domain configuration and virtual machine relocation management system 200 may include additional or fewer hypervisors as is known in the art. In an embodiment, the hypervisor A 202 which includes a hypervisor A architecture 208, which includes a plurality of resources, such as resources 232, 234, 236, and 238. In an embodiment, the resources are features and/or functionality provided by the hypervisor A 202. In an embodiment, the hypervisor A 202 additionally manages a virtual machine A 212 and a virtual machine B 214. In an embodiment, the virtual machine A 212 and virtual machine B 214 are managed by the hypervisor A 202.

Similarly, hypervisor B 204 includes a hypervisor B architecture 216, which includes a plurality of resources. In an embodiment, hypervisor B 204 includes some of the same resources as hypervisor A 202, such as resources 232 and 236, however, does not include resources 234 and 238 of hypervisor A 202. In addition, the hypervisor B 204 includes resource 240, which is not included in hypervisor A 202. In an embodiment, the resources are functions and/or functionality provided by the hypervisor B architecture 216. In an embodiment, the hypervisor B 204 includes one or more virtual machines executing within the hypervisor B 204, such as virtual machine C 220 and virtual machine D 222. In an embodiment, the virtual machine C 220 and virtual machine D 222 are managed by the hypervisor B 204.

In addition, hypervisor C 206 includes a hypervisor C architecture 224, which includes a plurality of resources. In an embodiment, hypervisor C 206 includes some of the same resources as hypervisor A 202, such as resources 232 and 234, however, does not include resources 236 and 238 of hypervisor A 202. In an embodiment, hypervisor C 206 additionally includes some of the same resources as hypervisor B 204, such as resources 232 and 240. In addition, the hypervisor C 206 includes resource 240, which is not included in hypervisor A 202. In an embodiment, the resources are functions and/or functionality provided by the hypervisor C architecture 224. In an embodiment, the hypervisor C 206 additionally includes one or more virtual machines executing within the hypervisor C 206, such as virtual machine E 228 and virtual machine F 230. In an embodiment, the virtual machine E 228 and virtual machine F 230 are managed by the hypervisor C 206.

In an embodiment, each of virtual machine A 212, virtual machine B 214, virtual machine C 220, virtual machine D 222, virtual machine E 228, and virtual machine F 230 are part of a domain 242. Although FIG. 2 depicts 3 hypervisors with various configurations, it will be understood that the elements of FIG. 2 are provided for purposes of clarity and that, in additional embodiments, any number or configuration of hypervisors, virtual machines, resources, and domains may be used to implement the methods and systems described herein.

Figure 3:
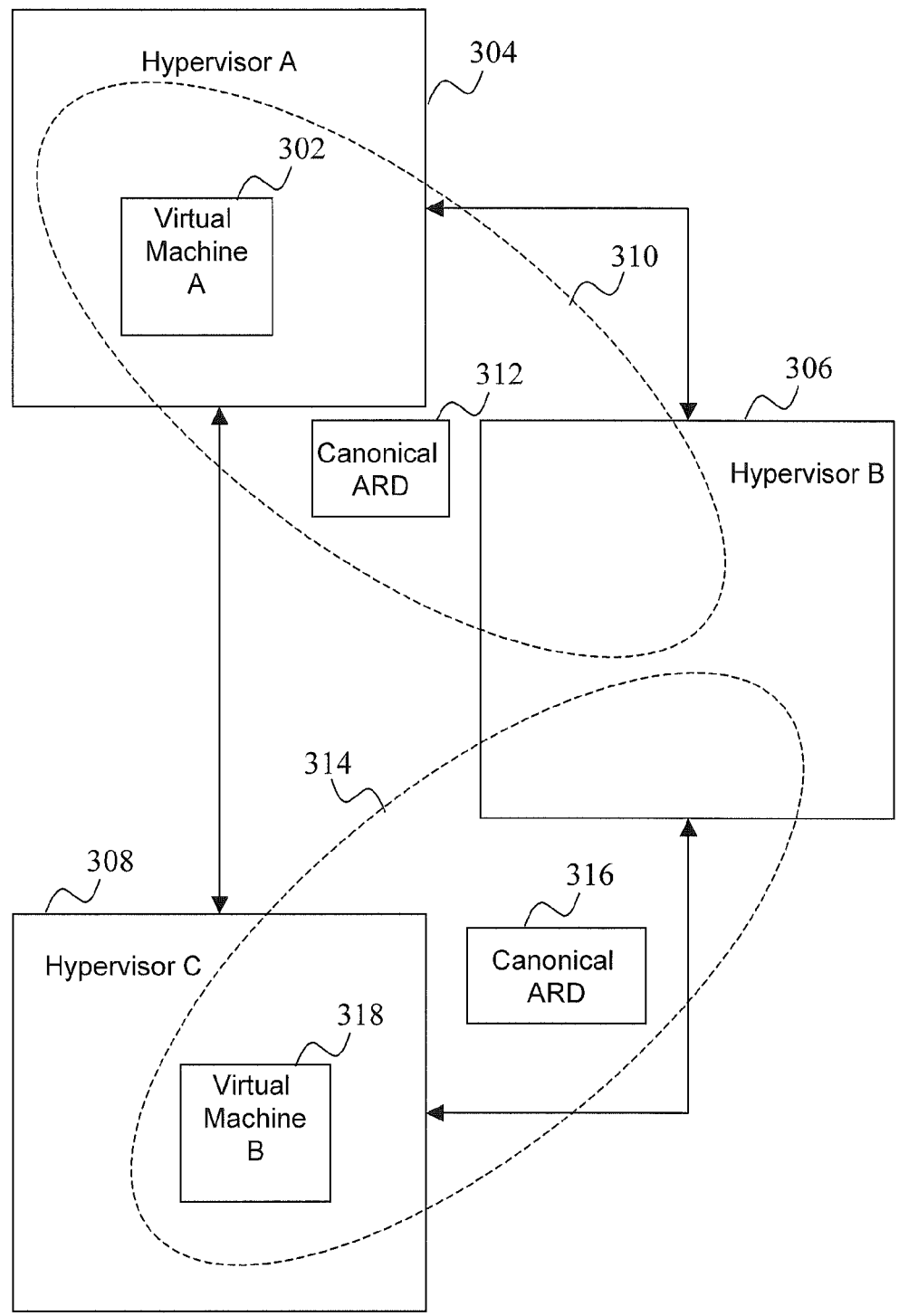
FIG. 3 is a schematic diagram that illustrates virtual machines executing within and among domains in an embodiment.

FIG. 3 is a schematic diagram that illustrates virtual machines executing within and among domains in an embodiment. FIG. 3 includes the three systems, hypervisor A 304 hypervisor B 306, and hypervisor C 308, similar to the hypervisors of the systems of FIG. 2 in an embodiment. In an embodiment, hypervisor A 304 includes a virtual machine A 302. The virtual machine A 302 is managed by the hypervisor A 304. In an embodiment, the virtual machine A 302 belongs to a first domain 310. The first domain 310 includes a canonical ARD 312. The canonical ARD 312 includes information specifying a maximal common subset of all of the resources that are available to virtual machines operating within the domain, such as the virtual machine A 302. In an embodiment the virtual machine A 302 may move between the hypervisors within the first domain 310, such as hypervisor A 304, and hypervisor B 306.

In an embodiment, hypervisor C 308 does not include a virtual machine that belongs to the first domain 310, but includes a virtual machine B 318 that belongs instead to a second domain 314. The second domain 314 includes a second canonical ARD 316. In an embodiment, the second canonical ARD 316 includes information specifying a maximal common subset of all of the resources that are available to virtual machines operating within the domain. In an embodiment, if the virtual machine 302 is moved to the hypervisor C 308, then a variant domain would be created based on the first domain 310, which variant would include the hypervisor C 308 as a member. The derivation of the variant ARD for this variant domain is described in more detail below.

Figure 4:
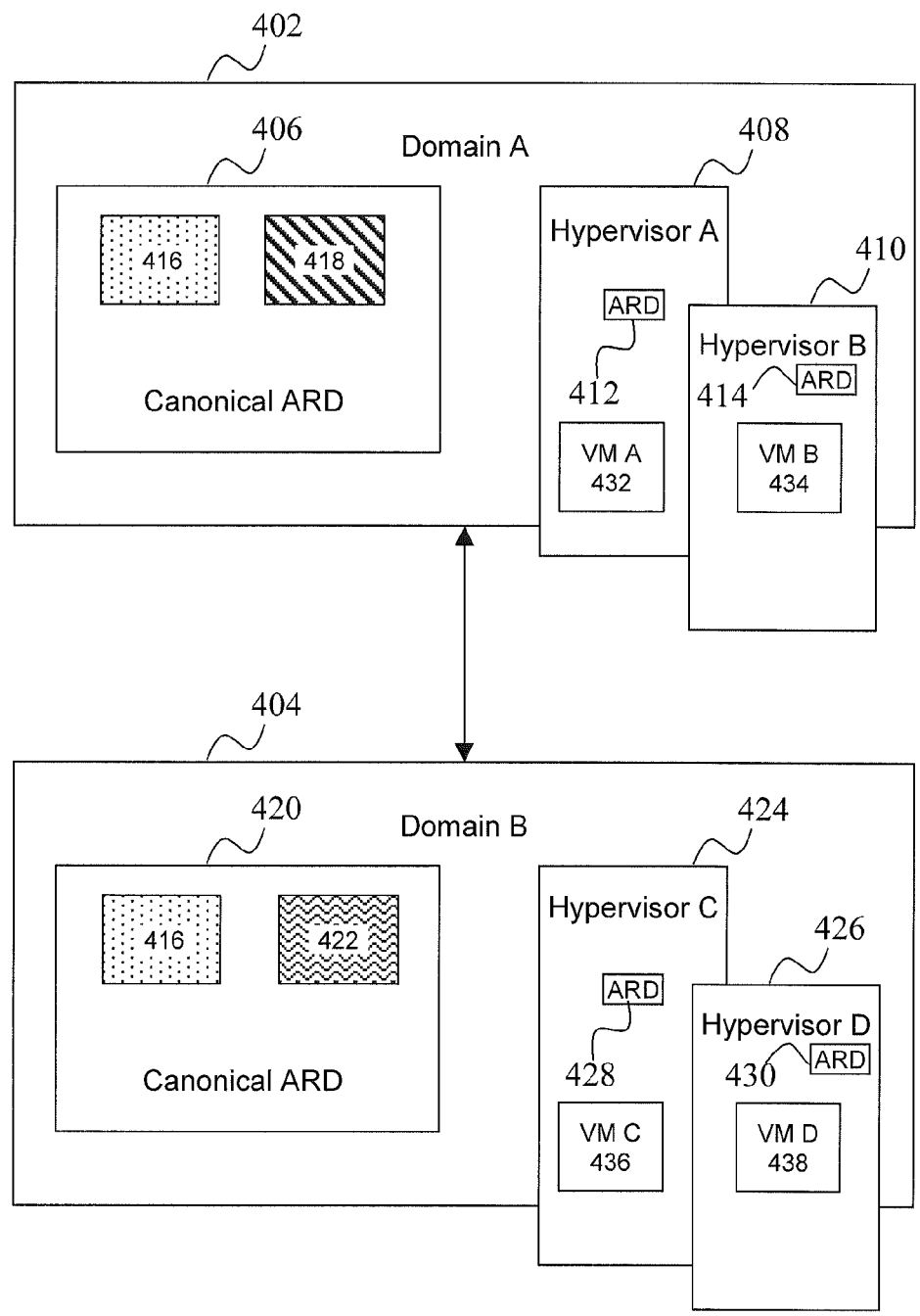
FIG. 4 illustrates a schematic diagram of a plurality of domains in an embodiment.

FIG. 4 illustrates a schematic diagram of a plurality of domains in an embodiment. The elements of FIG. 4 include hypervisors and domains such as the hypervisors and domains of FIGS. 2 and 3. FIG. 4 includes a domain A 402. In an embodiment, the domain A 402 includes virtual machine A 432 managed by hypervisor A 408 and virtual machine B 434 managed by hypervisor B 410. In an embodiment, the hypervisor A 408 includes a domain A ARD 412. In an embodiment, the domain A ARD 412 includes instructions indicating which resources are available within the hypervisor A 408. In an embodiment, the hypervisor B 410 includes a hypervisor B ARD 414. In an embodiment, the hypervisor B ARD 414 includes instructions indicating which resources are available within the hypervisor B 410. In an embodiment, the domain A 402 includes a domain A canonical ARD 406. The domain A canonical ARD 406 includes one or more resources, such as resources 416 and 418. The domain A canonical ARD 406 is updated as resources within the domain A 402 change either through upgrades or through the addition or removal of hypervisors from the domain. In an embodiment, the singleton ARD of each of the hypervisors indicates the maximum set of resources that a virtual machine executing on the hypervisor will have access to. In an embodiment, the domain A canonical ARD 406 is updated as new systems are added to the domain A 402. In an embodiment, the domain A canonical ARD 406 is updated as systems are removed from the domain, resources are added and removed from the systems of the domain, or any other event that causes a change to the resources available to the domain.

In an embodiment, one or more of the hypervisors in domain B 404 are in communication with one or more hypervisors in domain A 402. In an embodiment, the domain B 404 includes virtual machine C 436 managed by hypervisor C 424 and virtual machine D 438 managed by hypervisor D 426. Domain B 404 includes a domain B canonical ARD 420. In an embodiment the domain B canonical ARD 420 includes resources 416 and 422. In an embodiment, the resources included within the domain B canonical ARD 420 are the common resources available in hypervisor C 424 as defined in the hypervisor C ARD 428 and hypervisor D 426 as defined in its hypervisor D ARD 430.

In an embodiment, a canonical ARD for a domain is created using an operation that takes the intersection of the singleton ARDs of each hypervisor in the domain. In an embodiment, if hypervisor 1 includes the resources A, B, C, and D in its ARD, hypervisor 2 includes resources A, B, and C in its ARD, and hypervisor 3 includes resources B, C, and D, in its ARD then a domain that includes all three systems would have a canonical ARD which includes the intersection of all three ARD's, i.e. resources B and C. If hypervisor 3 is removed from the domain, then a new canonical ARD is created as the intersection of hypervisors 1 and 2, i.e., A, B, and C.

Figure 5:
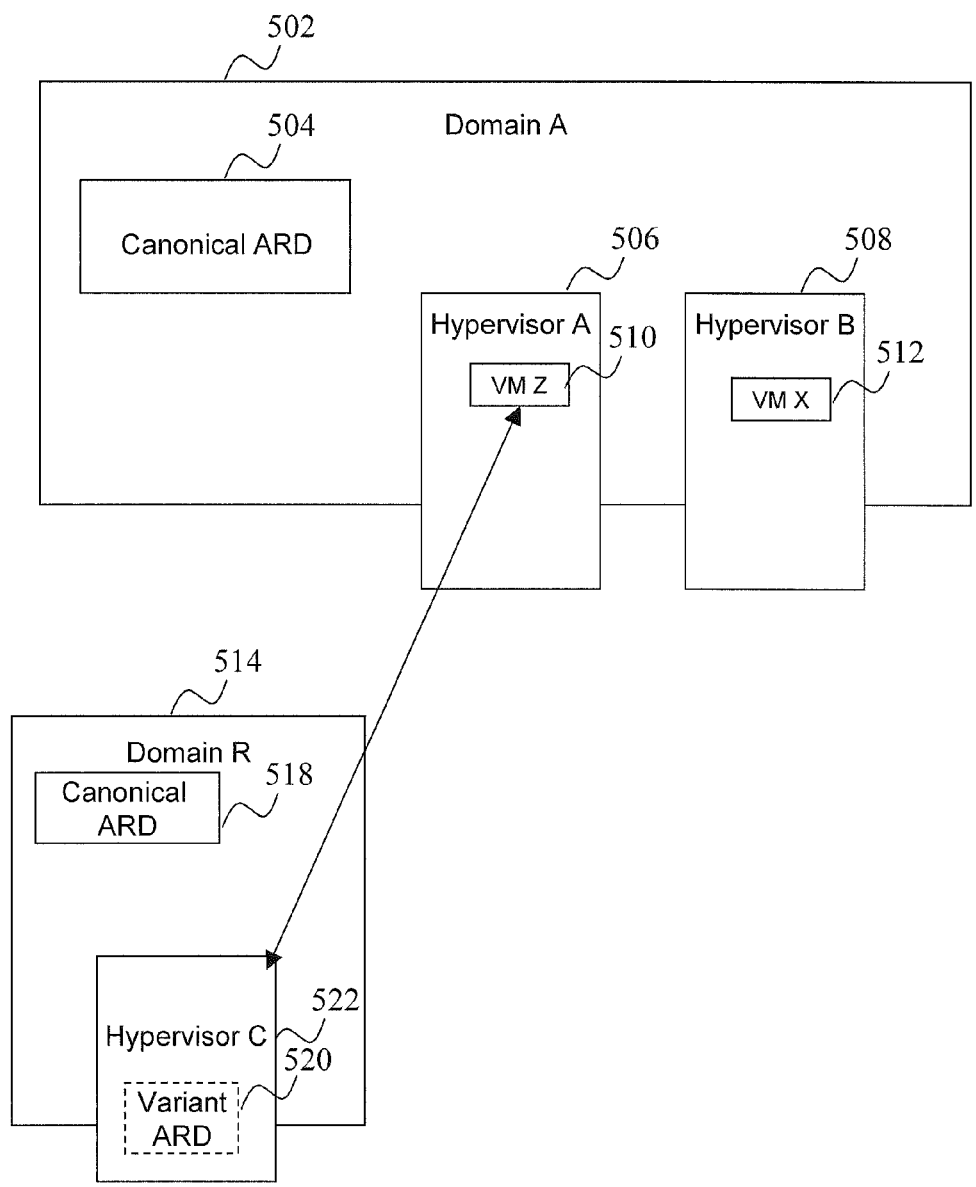
FIG. 5 illustrates a schematic diagram of the relocation of virtual machines between a plurality of hypervisors in an embodiment.

FIG. 5 illustrates a block diagram of the relocation of virtual machines between a plurality of hypervisors in an embodiment. The elements of FIG. 5 include hypervisors and domains such as the hypervisors and domains of FIGS. 2 and 3. FIG. 5 includes a domain A 502. In an embodiment, the domain A 502 includes a hypervisor A 506 and a hypervisor B 508. In an embodiment, the domain A 502 includes a canonical ARD 504. The hypervisor A 506 includes a virtual machine Z 510. In an embodiment, the virtual machine Z 510 may access any of the resources available in the canonical ARD 504. In an embodiment, the canonical ARD 504 includes an intersection of all of the resources available in the hypervisors within domain A 502, for example hypervisor A 506 and hypervisor B 508.

Domain R 514 includes a canonical ARD 518, with the resources of hypervisor C 522. In an embodiment virtual machine Z 510 is moved from the hypervisor A 506 to the hypervisor C 522. In an embodiment, the canonical ARD 518 of domain R 514 includes a superset of the resources of the canonical ARD 504 of domain A 502. When the virtual machine Z 510 is transferred to the hypervisor C 522 a variant ARD 520 is established and stored in the memory of the hypervisor C 522. In an embodiment, the hypervisor C 522 becomes a temporary member of the Domain A. In an embodiment, the temporary membership is established by an override setting in an override bit string of the variant ARD 520, which indicates that the hypervisor C 522 is to be considered a temporary member. The variant ARD 520 includes only the resources from the canonical ARD 504 of domain A 502. In an embodiment, when the virtual machine Z 510 is stopped, or moved to another hypervisor, the variant ARD 520 is removed. In an embodiment, multiple virtual machines can share a variant ARD, and the variant ARD is only deleted when all of the virtual machines that share the ARD are stopped or moved.

In an embodiment, one or more bit strings are used to efficiently indicate information related to the available resources, and the membership of virtual machines in a domain. In an embodiment, the domains each include a domain membership bit string. The domain membership bit string is part of a domain definition stored in each hypervisor, and indicates which members belong to a given domain. In an embodiment, each hypervisor further includes an override bit string. The override bit string matches in length and positional meaning the membership bit string, but is stored in the ARD. The override bit string is used to temporarily remove or add members to the domain. In an embodiment, the canonical ARD of a domain will have a zero override mask, but in a variant ARD, a bit in the override mask is set to one to indicate that a member should be added or removed based on the domain membership bit string. For example, if the domain membership bit string indicates that a hypervisor is a member of a domain, a one in the override bit string, in the location that represents the hypervisor, would remove the hypervisor from the effective domain membership, thus creating a variant domain which is described by its variant ARD. Similarly, setting a bit that corresponds to a hypervisor to one for a hypervisor that is not a member of a domain will add the hypervisor to the effective domain membership.

In an embodiment, the ARD itself has a resource bit string, which represents features or resources that may either be present or not present. In an embodiment, the ARD also includes other pieces of resource information. In an embodiment, these pieces of information are scalar quantities that describe how big or small a resource is, and labels that name a resource.

Although the various canonical ARDs are depicted as stored within the domains, it will be understood that, in an embodiment, the singleton domain canonical ARDs are stored in a storage device accessible by all of the systems.

Figure 6:
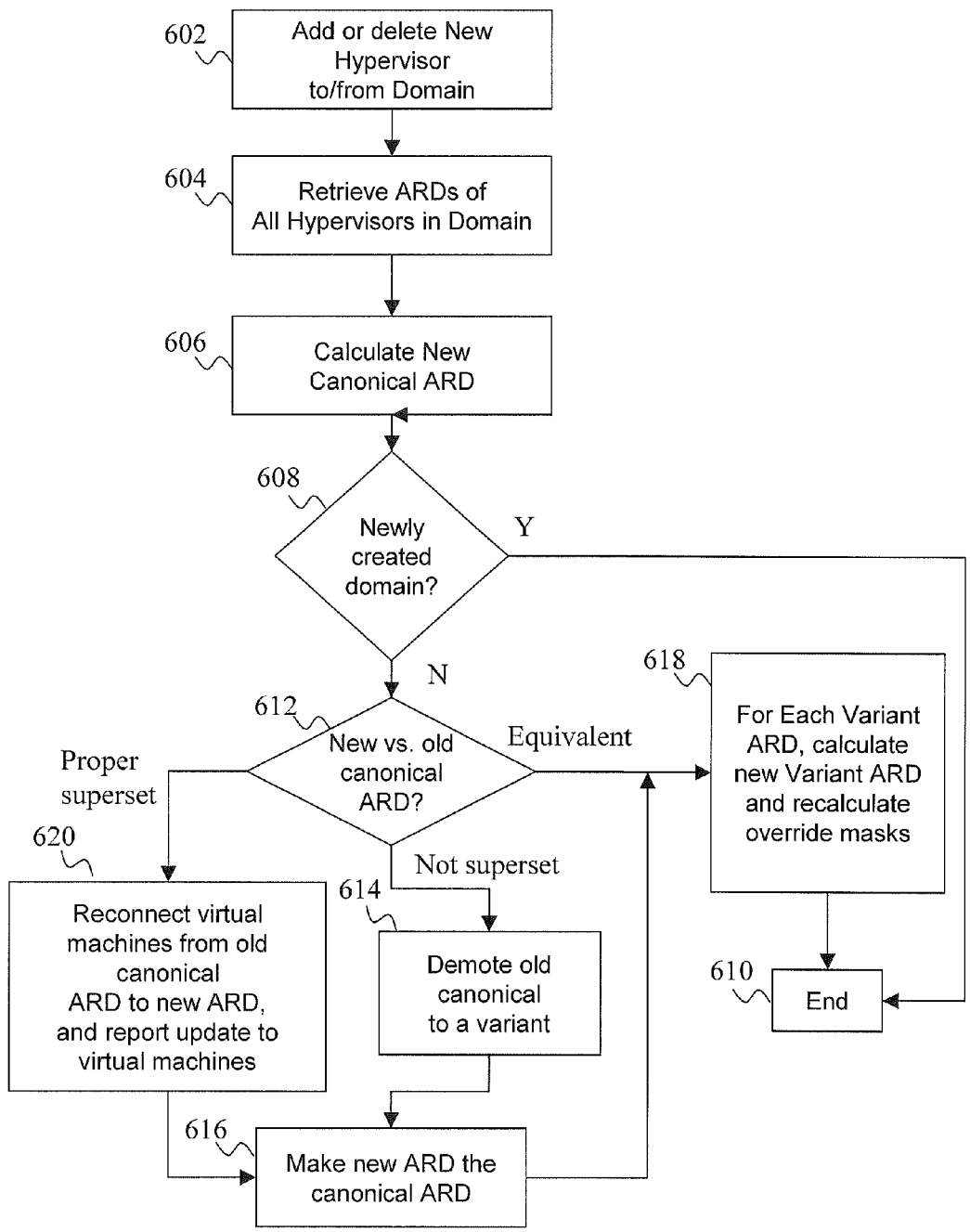
FIG. 6 illustrates a process flow of the addition or deletion of hypervisors to a domain in an embodiment.

FIG. 6 illustrates a process flow of the addition or deletion of hypervisors to a domain in an embodiment. In an embodiment, the process flow of FIG. 6 is executed by a domain management module, such as the domain management module 108 of FIG. 1. In an additional embodiment, the process flow of FIG. 6 is executed on the hypervisor which initiates the membership change, and through a message, on the other hypervisors in the cluster. At block 602 a new hypervisor is added to or deleted from a domain. At block 604, all of the singleton ARDs of all of the other hypervisors in the domain are retrieved. At block 606, a new canonical ARD is calculated by taking an intersection of all of the singleton ARDs of the member hypervisors of the domain. In an embodiment, the ARDs contain resource bit strings that are used to indicate which resources each of the hypervisors have available, wherein a 1 indicates that the resource is available, and a 0 indicates that it is not. In an embodiment, the ARDs comprise resource bit strings indicating the available resources, scalar quantities, which indicate the amount of available resource capacity, and labels to indicate the names of resources, virtual machine models, and other hypervisor information as is known in the art. In an embodiment, the intersection is computed by calculating the boolean AND of the bit strings and the arithmetic minimum of scalar quantities representing capacities or limitations, and choosing the label from the singleton ARD whose resource set is the closest superset to that of the canonical ARD being computed.

In an embodiment, ARD X is considered a subset of ARD Y (that is, the set of resources represented by X is a subset of that represented by Y) if, in every bit string indicating resources, every bit position which contains a one in Y also contains a one in X, and every scalar quantity indicating resource capacity has a value in Y greater than or equal to that in X. Conversely, ARD X is a superset of ARD Y if ARD Y is a subset of ARD X. ARDs X and Y are equivalent if both the corresponding bit strings and the corresponding scalar quantities are equal. As is known in the art, a proper subset and proper superset are defined as a superset and subset, respectively, which are not equivalent.

Next, at block 608, it is determined if a new domain is being created. If a new domain is being created, then processing is complete, block 610. Returning to block 608, if instead an existing domain is being modified, then at block 612, the new canonical ARD is compared with the old canonical ARD. If the new canonical ARD is not a superset of the old, that is, if the new canonical ARD omits one or more resources available in the old canonical ARD, then at block 614, the old canonical ARD is demoted to a variant ARD. Virtual machines connected to the old canonical ARD remain connected to it when it becomes a variant ARD in order to retain their existing resource set. This demoted (now variant) ARD will be processed further along with existing variant ARDs, as described below. Next, at block 616, the new ARD is installed as the canonical ARD, for use by any virtual machines subsequently instantiated in the domain. In an embodiment, the canonical ARDs are also stored in a central data repository accessible by all systems.

Processing of the canonical ARD is now complete. However, adjustments must be made to any variant ARDs associated with the domain. At block 618, all existing variant ARDs for this domain are updated as follows.

In an embodiment, for each variant ARD, which includes the old canonical ARD if retained as a variant, the set of resources described in that ARD is adjusted (i) to provide features in common with the new canonical ARD; and (ii) to retain features previously offered that are no longer compatible with the new canonical ARD. Further incompatible features are not added.

In an embodiment these steps are achieved using the intersection method described above together with a union method, which operates as follows: features represented by bit-strings are subject to the OR logical operation; the maximum value of pairs of scalar quantities are assigned to the union ARD; descriptive labels are chosen from the most closely supersetting singleton ARD.

In an embodiment the updated variant ARD is calculated as follows: a list of candidate members is derived from the membership mask and the override mask by means of a boolean exclusive OR operation. A temporary new variant is calculated using the candidate list and forming the maximal common subset of each candidate member's singleton ARD. The temporary ARD is intersected with the new canonical ARD for this domain. Finally, the resultant ARD is combined using the union operation, described above, with the original variant. The outcome from the union will possess precisely those features satisfying criteria (i) and (ii) above.

The override mask of the variant ARD is recalculated to prevent relocation of a virtual machine to a hypervisor that does not support the set of features offered by the variant ARD. This is done by initially setting each bit position to zero. Then, for each member in common with the new and old domain definitions, its singleton ARD is compared with the newly calculated variant ARD. If the variant is not a subset of or equivalent to the singleton, then the corresponding override mask bit is set. In an embodiment, once all of the variant ARDs are recalculated, processing of the domain membership change is completed at block 610.

Returning to block 612, if, as a result of the comparison of the old and new canonical ARDs, it is determined that the new ARD describes a proper superset of the resources in the old ARD (i.e., the new canonical ARD includes all of the resources in the old ARD, plus one or more additional resources) then processing continues at block 620. In an embodiment the superset occurs when a less-capable member is deleted from the domain, and the remaining members have additional features in common. At block 620, the virtual machines connected to the old canonical ARDs are instead connected to the new canonical ARD, and an update is reported to the virtual machines. In an embodiment, the virtual machines are allowed to use the added resources. Common processing is resumed at block 616 to designate the new canonical ARD and process the variant ARDs as described above.

Returning to block 612, if as a result of the comparison of the old and new canonical ARDs, it is determined that the new ARD is equivalent to the old ARD, then processing continues at block 618. At block 618 all existing variant ARDs for this domain are updated as described above. Once all of the existing variants have been updated, processing ends at block 610.

Figure 7:
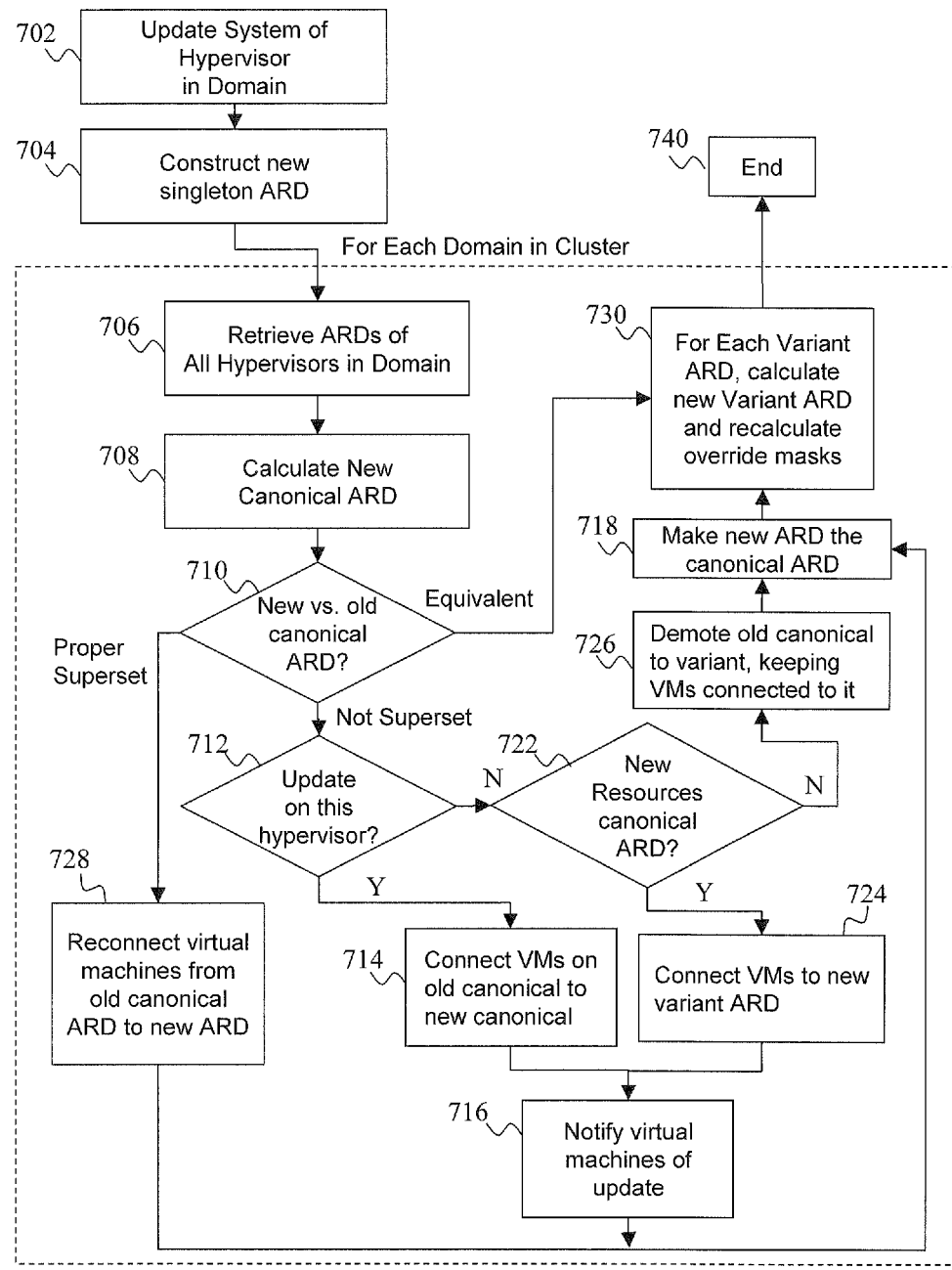
FIG. 7 illustrates a process flow of a system update for a hypervisor within a domain in an embodiment.

FIG. 7 illustrates a process flow of a system update (i.e., an upgrade and/or downgrade of available resources in the underlying hardware, firmware, and/or hypervisor) for a hypervisor within a domain in an embodiment. In an embodiment, the process flow of FIG. 7 is executed by a domain management module, such as the domain management module 108 of FIG. 1. In an additional embodiment, the process flow of FIG. 7 is executed on the upgraded hypervisor itself after it has been upgraded. At block 702 a hypervisor in the domain is upgraded. At block 704, a new version of the hypervisor's singleton ARD is created to reflect the new set of available resources. In an embodiment, the update adds additional resources to the system on which the hypervisor is running. In an additional embodiment, the update removes resources from the system.

In an embodiment, the ARDs describing the different resource sets available by domain, including variant domains, need to be adjusted to reflect a new resource set on the updated system. Any domains that include the updated system as a member may need to be adjusted, along with variant domains which include the updated member through their override masks. Thus, the remainder of the process in FIG. 7 is performed for each domain defined in the cluster.

At block 706, all of the singleton ARDs from all of the hypervisors in the domain are retrieved. At block 708, a new canonical ARD is calculated from the intersection of these singleton ARDs. At block 710, the new canonical ARD is compared to the existing canonical ARD in order to determine the differences in resources between them. At block 712, if the upgraded hypervisor's ARD is not a superset of or equivalent to the current canonical ARD (i.e., it lacks one or more resources in the current canonical ARD), it is determined if this process flow is executing on a hypervisor on the system that experienced the update. At block 714, if the update occurred on the system executing the flow, then any virtual machines on that hypervisor that are connected to the current canonical ARD are reconnected to the new canonical ARD. The resources which were lost in the update will no longer be available to those virtual machines. At block 716, all of the virtual machines in the domain are notified of this virtual update to their resource set. At block 718, the new canonical ARD is stored.

At block 730, each variant ARD, if any, for this domain is adjusted. In an embodiment, the hypervisor is executing on the updated member system, therefore the set of resources represented by each variant ARD is adjusted to conform with the following criteria: (i) to provide features in common with the new canonical ARD; (ii) to retain features previously offered that are no longer compatible with the new canonical ARD, provided that they are still available on this member; and (iii) to omit resources that are no longer available on the updated member system. In an embodiment the adjustment is performed using the intersection and union methods described above.

In an embodiment, the updated variant ARD is calculated as follows: a list of candidate members is derived from the membership mask and the override mask by an exclusive OR operation. A temporary new variant is calculated using the candidate list and forming the maximal common subset of each candidate member's singleton ARD (using the new singleton ARD for the updated system). The temporary ARD is intersected with the new canonical ARD for this domain. Then the intersection of the old variant ARD with the updated singleton ARD is formed. Finally, the resultant ARD is obtained by forming the union of these two intersections. The outcome from the union will include those features satisfying criteria (i) through (iii) above. An override mask of the new variant ARD is set in the same manner as described above, so that the effective membership of the variant domain includes only hypervisors that provide the resources represented in the variant domain. In an embodiment, if the resource set available through the variant domain has changed, all virtual machines connected to the variant ARD are notified of the update.

Once all of the canonical and variant ARDs have been processed for each domain in the cluster, processing ends at block 740.

Returning to block 712, if this process flow is executing on a system other than the one that experienced the update, then at block 722, it is determined whether the new canonical ARD calculated at block 708 includes any resources not available in the old canonical ARD. If so, then at block 724, a new variant ARD is created which includes these added resources but preserves the resources lost in the new canonical ARD. All virtual machines connected to the old canonical ARD are reconnected to this new variant ARD. In an embodiment, this allows them to obtain the resources added by the update, without losing resources they may currently be using that have been dropped from the maximal common subset of the domain due to the update on the other system. The override mask of the new variant ARD is set, in the same way as described above, so that the effective membership of this variant domain includes only hypervisors that can provide the resources represented in it. Following block 724, processing continues as before at block 716, to notify virtual machines connected to the canonical ARD of the updated resource set.

Returning to block 722, if the new canonical ARD adds no new resources (that is, it is a proper subset of the old canonical ARD), then processing continues at block 726. At block 726, the old canonical ARD is demoted to a variant ARD. The virtual machines connected to the old canonical ARD remain connected to this variant, so that they do not experience any change in resource set. The override mask in the variant is set to exclude the hypervisor on which the update occurred, since it can no longer deliver the resources required by this ARD. Since there is no change of which to notify the virtual machines, processing can then continue with the installation of the new canonical ARD at block 718.

As will be seen from FIG. 7, all of the flows involving an update to a different system than the one on which the hypervisor is executing (that is, the flows which take the "No" branch from block 712 or take paths that bypass the test at 712) also arrive at block 730 to process the variant ARDs for each domain. The processing of block 730 has been described above, however, in an embodiment, when the hypervisor is executing on a member that is not subject to the update, an additional check for compatibility is made. The old variant is compared with the recalculated variant. If the recalculated variant is not a superset of or equivalent to the old variant, the recalculated variant is discarded, and the override mask bit corresponding to the updated member is set to exclude that member. The variant ARD is recalculated by forming a temporary ARD from the intersection of the candidate members' singleton ARDs. In an embodiment, the temporary ARD is intersected with the domain's canonical ARD and the resultant ARD is combined, using a union operation, with the old variant ARD. The result of the union replaces the old variant ARD. The use of the new variant avoids removing resources from virtual machines connected to the variant ARD when they are executing on a member where those resources have remained unchanged. In an embodiment, this processing removes the downgraded member from the variant domain, and prohibits relocation to it, rather than subjecting virtual machines to a disruptive downgrade of the resource set in that variant domain. Once all of the canonical and variant ARDs have been processed for each domain in the cluster, processing ends at block 740.

Returning to block 710, if the newly calculated canonical ARD is a proper superset of the existing canonical ARD (i.e. has all the resources available in the current canonical ARD and more), then at block 728, all virtual machines connected to the old canonical ARD are reconnected to the new canonical ARD, so that they can take advantage of the added features, and common processing is rejoined at block 716 with notifying the affected virtual machines of this update.

Returning again to block 710, if instead the new and old canonical ARDs are equivalent (i.e., describe the same set of resources), then the old canonical ARD can be left in place, and the virtual machines connected to it are not affected. However, changes may still be needed to the variant ARDs for this domain, because they may have different resource sets or effective memberships and therefore be affected by the system update. Therefore, execution continues at block 730 with the processing of the variant ARDs as described above. Once all of the canonical and variant ARDs have been processed for each domain in the cluster, processing ends at block 740.

Figure 8:
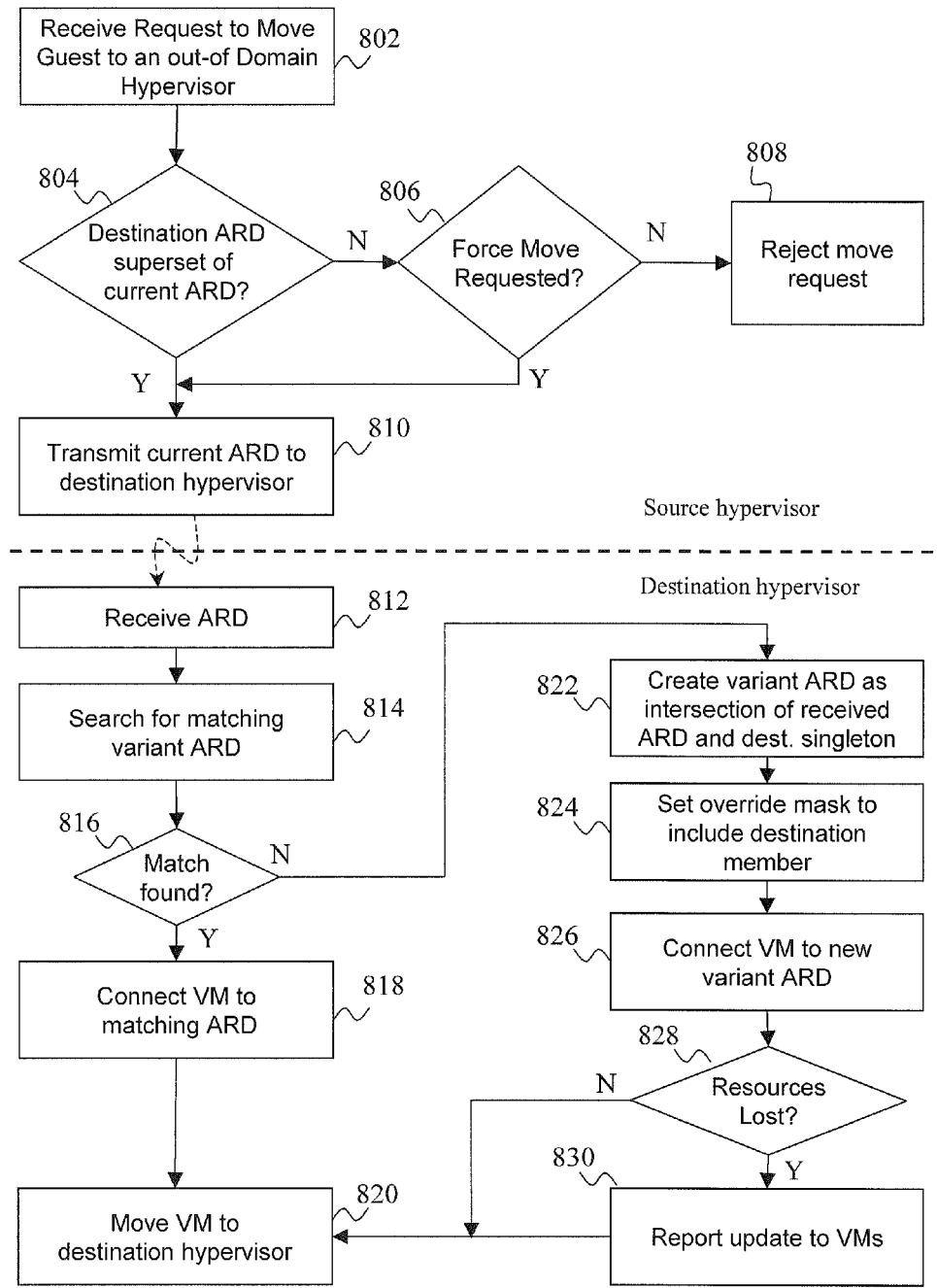
FIG. 8 illustrates a process flow of the movement of a virtual machine from one hypervisor to a new hypervisor that is not in the virtual machine's domain in an embodiment.

FIG. 8 illustrates a process flow of the movement of a virtual machine from one hypervisor to a new hypervisor that is not in the virtual machine's domain in an embodiment. In an embodiment, the process flow of FIG. 8 is executed by a domain management module such as the domain management module 108 of FIG. 1. In an additional embodiment, the process flow of FIG. 8 is executed on the system including the virtual machine. In yet another embodiment, the process flow of FIG. 8 is executed by a hypervisor or virtual machine cluster management software.

At block 802 a request to move a virtual machine from its current domain to a new out-of-domain hypervisor is received. At block 804 it is determined if the destination hypervisor's singleton ARD is a superset of or equivalent to the current virtual machine's ARD. If the destination hypervisor's singleton ARD is not a superset of, or equivalent to, the virtual machine's current ARD, then at block 806 it is determined if a force move has been requested. If a force move was not requested, then the virtual machine is not moved to the new hypervisor and the move request is rejected at block 808. This prevents a reduction of resources, which may cause the virtual machine to fail. Returning to block 806, if a force move was requested, then relocation is permitted to continue even though the virtual machine's resources will be limited. At block 810, the virtual machine's current ARD is transmitted to the destination hypervisor, and domain-related processing is concluded on the source hypervisor.

Returning to block 804, if the new hypervisor's singleton ARD is a superset of or equivalent to the virtual machine's current ARD, then the force option is not required, and processing continues with the transmission of the ARD at block 810.

In an embodiment, the remainder blocks of FIG. 8 are processed on the destination hypervisor. At block 812, the ARD transmitted at block 810 is received on the destination hypervisor. At block 814, the set of variant ARDs for the virtual machine's domain is searched for a matching variant ARD. At block 816, if a matching variant ARD is found, the incoming virtual machine is connected to it at block 818. At block 820, the virtual machine is moved to the destination hypervisor. Returning to block 816, if a matching variant ARD is not found, a new variant ARD is created at block 822 by intersecting the received ARD with the destination hypervisor's singleton ARD using the method described earlier. The intersection prevents the new variant ARD from allowing the virtual machine to use resources that are not available on the destination hypervisor. At block 824, the destination hypervisor is included in the new variant ARD's override mask. At block 826, the virtual machine is connected to the new variant ARD. At block 828, it is determined if resources have been lost as a result of the move to the destination hypervisor. If it is determined that resources have been lost, then at block 830 the update is reported to the virtual machine. Processing then concludes at block 820, where the virtual machine is moved to the new hypervisor. Returning to block 828, if the move results in no loss of resources, then the virtual machine is moved to the new destination hypervisor, and the virtual machine is not notified.

In an embodiment, instead of assigning the virtual machine to a variant domain, the virtual machine is moved to a domain in which the hypervisor is currently operating. In an embodiment, when the virtual machine moves to a new domain, it is allowed to access any new functions available to the new domain.

Technical effects and benefits include a system for managing virtual machine relocation in a virtual machine environment among systems with varying resource sets, without requiring a restart of the virtual machine. An additional benefit is a centralized repository of the available resources of all of the systems in a virtual machine cluster. Yet another benefit is the ability to move virtual machines to domains with additional resources, while maintaining the current resource set for the virtual machine, which allows the virtual machine to return to its home system at any time without loss of function. A further benefit is the ability to upgrade systems and avail running virtual machines of newly added resources when this would not impede their relocation within the domain.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be constructed to maintain the proper protection for the invention first described.

What is claimed is:

1. A system for dynamic relocation of virtual machines in a domain, comprising:

a domain management module configured to execute on a computer processor, the system configured to:

receive a request to add a new hypervisor to a domain, the new hypervisor comprising a singleton architecture description (ARD); and generate a new canonical ARD for the domain, the new canonical ARD comprising an indicator of resources available to one or more virtual machines executing in the domain;

wherein a virtual machine executing on any hypervisor in the domain is moved to any other hypervisor in the domain without losing resources, and wherein in response to determining that the new hypervisor has fewer resources than an existing canonical ARD, a variant ARD is created, the variant ARD including all resources of the existing canonical ARD, and the variant ARD is connected to all of the one or more virtual machines previously executing in the domain.

2. The system of claim 1, wherein the new canonical ARD comprises data which identify a maximal common subset of resources available to virtual machines executing on any hypervisor within the domain.

3. The system of claim 1, wherein the singleton ARD includes data that identify all of one or more resources available to virtual machines executing on the new hypervisor.

4. The system of claim 3, wherein the one or more resources available on the new hypervisor include functions provided by the hypervisor.

5. The system of claim 1, wherein the new canonical ARD is generated by calculating an intersection of all singleton ARDs of all of a plurality of hypervisors in the domain.

* * * * *